(12) United States Patent
Ishikawa (10) Patent No.: US 8,184,007 B2
(45) Date of Patent: May 22, 2012

(54) WIRELESS TAG READER/WRITER (75) Inventor: Atsushi Ishikawa, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1111 days.

(21) Appl. No.: 12/042,594

(22) Filed: Mar. 5, 2008

(65) Prior Publication Data
US 2009/0009336 A1  Jan. 8, 2009

(30) Foreign Application Priority Data

Jul. 2, 2007 (JP) ................. 2007-174201

(51) Int. Cl.
G08B 13/14 (2006.01)
G08B 21/00 (2006.01)
H04B 3/36 (2006.01)
H04B 7/15 (2006.01)
G06K 7/10 (2006.01)

(52) U.S. Cl. .......... 340/572.7; 340/686.1; 340/687; 455/7; 455/11.1; 235/462.45

(58) Field of Classification Search .......... 340/10.2
See application file for complete search history.

(56) References Cited

U.S. PATENT DOCUMENTS 6,909,366 B1 *  6/2005  Marsh et al. ............. 340/505
7,388,491 B2 *  6/2008  Chand et al. ............ 340/572.1
2003/0107485 A1 *  6/2003  Zoratti .................. 340/568.1
2005/0083181 A1 *  4/2005  Jalkanen et al. .......... 340/10.34
2006/0176152 A1 *  8/2006  Wagner et al. ........... 340/10.2
2006/0213992 A1   9/2006  Ishikawa
2006/0214796 A1   9/2006  Ishikawa
2006/0214800 A1   9/2006  Ishikawa
2006/0267733 A1 * 11/2006  Steinke et al. ........... 340/10.1
2007/0182560 A1   8/2007  Mori et al.
2009/0002170 A1   1/2009  Ishikawa
2009/0015408 A1   1/2009  Asai et al.

FOREIGN PATENT DOCUMENTS

JP  2005-235180   9/2005
JP  2005-535968  11/2005
WO  2004/015613   2/2004

OTHER PUBLICATIONS

Minister for Public Management, Home Affairs, Posts and Telecommunications Order Subparagraph 49.
Minister for Public Management, Home Affairs, Posts and Telecommunications Order Subparagraph 385.

* cited by examiner

Primary Examiner — Daniel Wu
Assistant Examiner — Pameshanand Mahase
(74) Attorney, Agent, or Firm — Turocy & Watson, LLP (57) ABSTRACT In a wireless reader/writer according to one example of the present invention, a reader/writer main body 120 emits a radio wave with a different output power from an antenna 121 when a base unit 140 is detected to be mounted on an enclosure. In addition, when a base unit 140A is detected to be mounted on the enclosure, a reader/writer main body 120A controls a switching device 132 to emit radio waves simultaneously or alternately from a first antenna and a second antenna.

9 Claims, 5 Drawing Sheets

WIRELESS TAG READER/WRITER

CROSS-REFERENCE TO RELATED APPLICATION

This application is based upon and claims the benefit of priority from prior Japanese Patent Application No. 2007-174201, filed Jul. 2, 2007, the entire contents of which are incorporated herein by reference.

BACKGROUND OF THE INVENTION

1. Field of the Invention

The present invention relates to a wireless tag reader/writer that transmits and receives a signal to or from a wireless tag, and more particularly, to a wireless tag reader/writer capable of changing an output power of a radio wave to be emitted.

2. Description of the Related Art

In case a small number of wireless tags are read out or written at a time, an output power of a radio wave emitted from a wireless tag reader/writer does not need to be large. However, in case a large number of wireless tags are read out or written at a time, the output power of the radio wave emitted from the wireless tag reader/writer needs to be large. However, when the output power of the radio wave emitted from the wireless tag reader/writer is made large, interference with a radio wave emitted from another wireless tag reader/writer occurs, and wireless tags may not be appropriately read out or written. For this reason, an output power of a radio wave emitted from a wireless tag reader/writer needs to be controlled.

With respect to the above point, there has been suggested a technique for communicating with wireless tags by emitting a radio wave in both a short and a long transmission intervals without setting the wireless tags in a sleep mode and without maximizing a transmission output power of the radio wave (for example, see Jpn. Pat. Appln. Laid-Open Publication No. 2005-535968). In addition, there has been suggested a technique in which a wireless tag reader/writer is controlled to display a success rate of communication with wireless tags (for example, see Jpn. Pat. Appln. Laid-Open Publication No. 2005-235180).

However, according to the technique described in Jpn. Pat. Appln. Laid-Open Publication No. 2005-535968, an output power of a radio wave is not made high. On the other hand, in case wireless tags are of a passive type that receives a radio wave to generate power, an amount of power necessary for activating one wireless tag is predetermined. Therefore, according to this technique, there has been a problem that an amount of power is insufficient for reading out and writing a large number of wireless tags.

In addition, in the above-described technique, a radio wave having a long transmission interval is transmitted. On the other hand, a frequency band that can be used is limited. Therefore, according to the technique described in the above Publication, there has been a problem that a frequency band cannot be used efficiently. With respect to this point, depending on a frequency band of a transmitted radio wave, executive authorities may limit continuous transmission of a radio wave for a certain period of time (for example, Minister for Public Management, Home Affairs, Posts and Telecommunications Order Subparagraph 49 based on Radio Facility Regulation Article 49-9 based on Radio Law, and Minister for Public Management, Home Affairs, Posts and Telecommunications Order Subparagraph 385 based on the same Regulation Article 49-14). In this case, there has been a problem that the technique described in this Publication cannot be adopted.

In addition, the technique described in Jpn. Pat. Appln. Laid-Open Publication No. 2005-235180 merely displays a success rate of communication with wireless tags, and there has been a problem that a specific technique for reading out and writing a large number of wireless tags existing densely is not suggested.

SUMMARY OF THE INVENTION

The present invention provides a wireless tag reader/writer capable of appropriately reading out and writing wireless tags in case of reading out and writing a small number of wireless tags and also in case of reading out and writing a large number of wireless tags.

According to an aspect of the present invention, there is provided a wireless tag reader/writer, including: an antenna that transmits and receives a signal to and from a wireless tag; and a reader/writer main body that processes the signal, wherein, when a base unit that supports an enclosure containing the antenna and the reader/writer main body is detected to be mounted on the enclosure, the reader/writer main body emits a radio wave with an output power different from an output power of a radio wave emitted when the base unit is not detected to be mounted on the enclosure.

According to another aspect of the present invention, there is provided a wireless tag reader/writer, including: a first antenna that transmits and receives a signal to and from a wireless tag; a reader/writer main body that includes a switching device for switching the antenna that transmits and receives the signal, and processes the signal; and a mounting/demounting detecting unit that detects whether a base unit that includes a second antenna that transmits and receives a signal to and from the wireless tag, and supports an enclosure containing the antenna and the reader/writer main body is mounted on the enclosure, wherein, when the mounting/demounting detecting unit detects that the base unit is mounted on the enclosure, the reader/writer main body controls the switching device to emit radio waves simultaneously or alternately from the first antenna and the second antenna.

According to an aspect of the present invention, a wireless tag reader/writer can emit radio waves with an appropriate output power corresponding to the number of wireless tags to be read and written, and there is an advantage that in case of reading and writing a small number of wireless tags and also in case of reading and writing a large number of wireless tags, the wireless tags can be read and written appropriately. In addition, even if a large number of wireless tags to be read and written exist densely and disorderly, the wireless tags can be read and written appropriately.

DETAILED DESCRIPTION OF THE PREFERRED EMBODIMENTS

Hereinafter, an embodiment of a wireless tag reader/writer of the present invention will be described in detail with reference to the accompanying drawings. The wireless tag reader/writer in the present invention includes a device that reads out information from a wireless tag or a device that writes information in the wireless tag, or a device that carries out both reading out and writing of information. In addition, the wireless tag means a storage medium capable of wireless communication, and normally has an antenna and an IC chip. The wireless tag may further have a calculating function. The wireless tag desirably has a size to be capable of being carried around, however, may have a minute size. The wireless tag is sometimes called an RFID (Radio Frequency Identification).

<Outline of Embodiments>

The wireless tag reader/writer of the present embodiment is a wireless tag reader/writer that includes an antenna that transmits or receives a signal to or from a large number of wireless tags gathered in the vicinity of the antenna and a reader/writer main body that processes the signal. When a base unit that supports an enclosure containing the antenna and the reader/writer main body is detected to be mounted on the enclosure, the reader/writer main body emits a radio wave with an output power different from an output power of a radio wave emitted at the time the based unit is not detected to be mounted on the enclosure.

In addition, when the base unit includes a plurality of second antennas, and the base unit is detected to be mounted on the enclosure, the reader/writer main body emits radio waves simultaneously, or alternately, from the antenna and the plurality of second antennas. Hereinafter, description will be made more in detail.

<Details of First Embodiment>
<Configurations of Wireless Tag and Wireless Tag Reader/Writer of First Embodiment>

Figure 1:
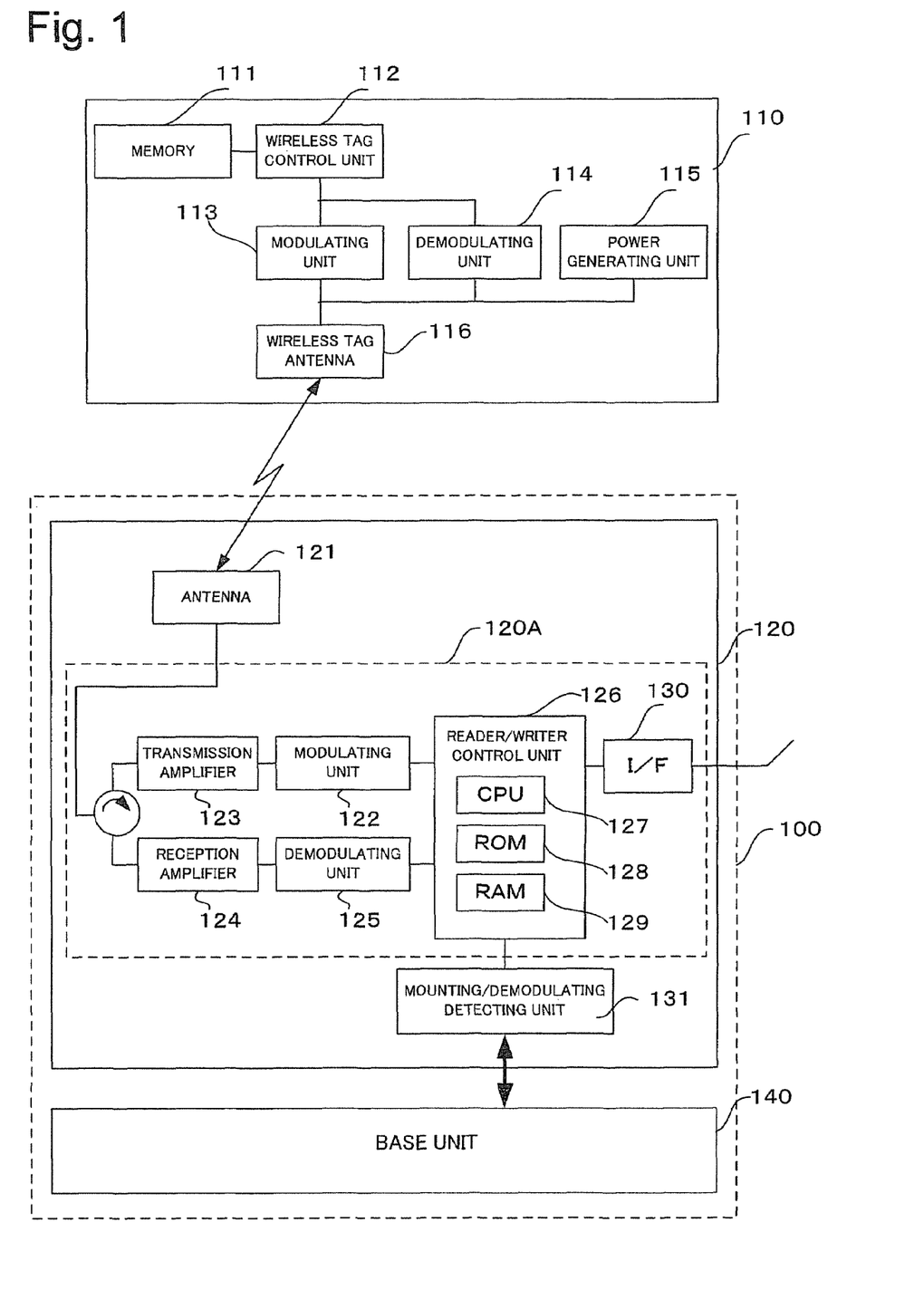
FIG. 1 is a view showing an outline of configurations of a wireless tag and a wireless tag reader/writer of a first embodiment.

FIG. 1 is a view showing an outline of configurations of the wireless tag and the wireless tag reader/writer of the present embodiment. As shown in FIG. 1, a wireless tag 110 includes a memory 111 which is a storage device, a wireless tag control unit 112 that carries out reading out and writing of data with respect to the memory 111, a power generating unit 115 that supplies power by rectifying and stabilizing a received modulated electromagnetic wave, a modulating unit 113 that modulates data sent out from the wireless tag control unit 112 and sends out the data to a wireless tag antenna 116, and a demodulating unit 114 that demodulates the received modulated electromagnetic wave and sends out the electromagnetic wave to the wireless tag control unit 112.

A wireless tag reader/writer 120 of the present embodiment includes an antenna 121 that transmits and receives a signal to or from the wireless tag 110, a reader/writer main body 120a that processes the signal, and a mounting/demounting detecting unit 131 that detects whether a base unit 140 that supports an enclosure containing the antenna 121 and the reader/writer main body 120a is mounted on the enclosure.

The base unit 140 has a convex unit that fits with, for example, a concave unit of the mounting/demounting detecting unit 131. When the base unit 140 is mounted on the enclosure, the convex unit fits with the concave unit. The mounting/demounting detecting unit 131 has a detecting means, such as an optical sensor and a mechanical switch, for detecting the convex unit. When the convex unit fits with the concave unit, the detecting means detects that the base unit 140 is mounted, and outputs a signal to the reader/writer main body 120a. The detecting means is not limited to the above.

The base unit 140 may have any shape. For example, there is a stand form shape in which the enclosure of a horizontal type is made standing vertically.

The reader/writer main body 120a includes the antenna 121 which is an antenna for transmitting and receiving a signal to or from a wireless tag by an electromagnetic wave, a reader/writer control unit 126 that controls hardware communicating with and connected to the wireless tag 110, a modulating unit 122 that modulates data sent out from the reader/writer control unit 126, a transmission amplifier 123 that amplifies the modulated signal and sends out the signal to the antenna 121, a reception amplifier 124 that amplifies the received modulated electromagnetic wave, a demodulating unit 125 that demodulates the received modulated signal, and an interface 130 that is connected to a host device, such as a personal computer 201, to exchange data. In addition, the reader/writer control unit 126 includes a CPU 127, and a ROM 128 and a RAM 129 that store data.

<Operation of Wireless Tag Reader/Writer of First Embodiment>

When the mounting/demounting detecting unit 131 detects that the base unit 140 is mounted on the enclosure, the reader/writer main body 120a of the present embodiment emits a radio wave with an output power different from an output power of a radio wave emitted from the antenna 121 when the wireless tag reader/writer 120 does not detect that the base unit 140 is mounted on the enclosure.

For example, in the wireless tag reader/writer 120 of the present embodiment, when the mounting/demounting detecting unit 131 does not detect that the base unit 140 is mounted on the enclosure, the reader/writer main body 120a emits a radio wave with a first output power from the antenna 121. When the mounting/demounting detecting unit 131 detects that the base unit 140 is mounted on the enclosure, the reader/writer main body 120a emits a radio wave with a second output power from the antenna 121.

Figure 2A:
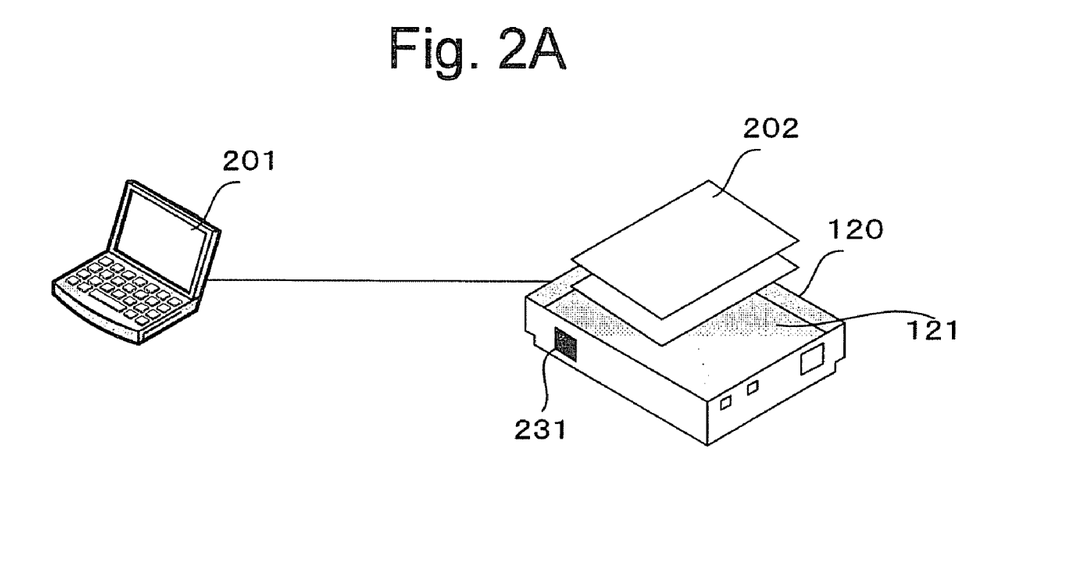
FIG. 2A is a view showing a use state of when the wireless tag reader/writer is placed horizontally in the first embodiment.
Figure 2B:
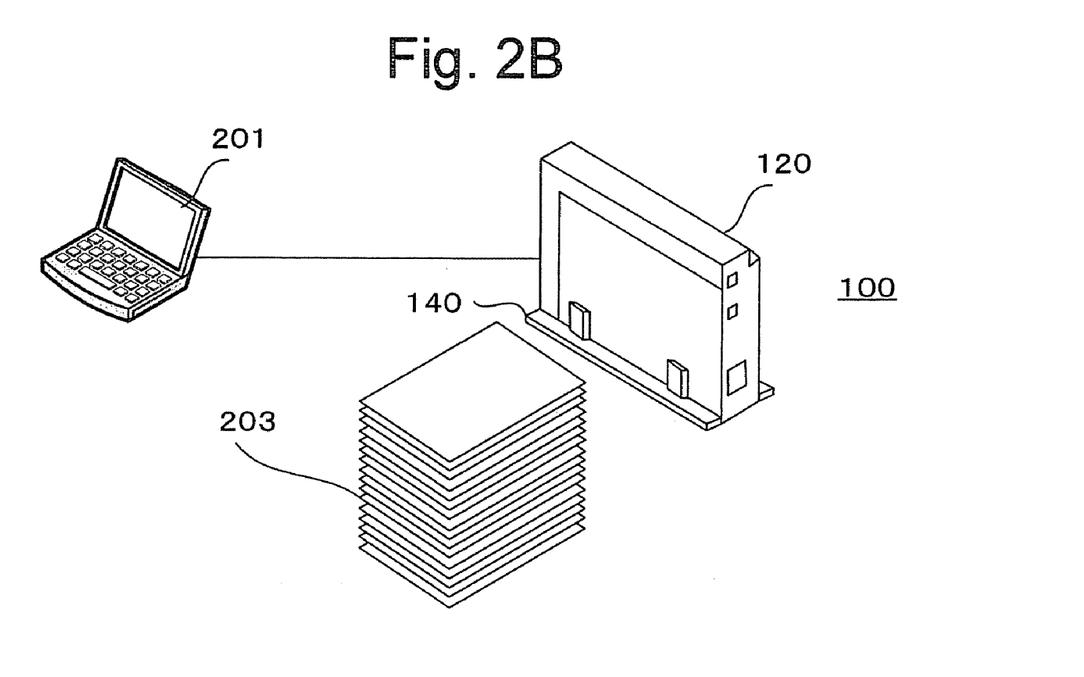
FIG. 2B is a view showing a use state of when the wireless tag reader/writer is placed vertically in the first embodiment.

FIGS. 2A and 2B are views showing use states of the wireless tag reader/writer 120 of the present embodiment. As shown in FIG. 2A, when the base unit 140 is not mounted, for example, the wireless tag reader/writer 120 is placed horizontally to be used.

In the above state, the wireless tag reader/writer 120 emits a radio wave with the first output power, which is 100 mW or higher and 200 mW or lower, for example. This output power has a value desirable for when a small number, one to five, of wireless tags 202 are read out by the wireless tag reader/writer 120 in a manner that the wireless tags 202 are held and moved over the wireless tag reader/writer 120.

As shown in FIG. 2B, the base unit 140 is mounted on the wireless tag reader/writer 120 in a manner that the convex unit (not shown) of the base unit 140 fits with a concave unit 231, and thereby a vertically-placed set 100 is constituted.

In the vertically-placed set 100, the wireless tag reader/writer 120 emits a radio wave with the second output power, for example, an output power of around 300 mW or higher and 500 mW or lower, which is different from the first output power. This output power has a value desirable for when a large number, around six to several tens, of wireless tags 202 existing densely are read out by the wireless tag reader/writer 120.

In short, when the wireless tag reader/writer 120 is placed vertically, an output power of a radio wave to be emitted is preferably made larger than when the wireless tag reader/writer 120 is placed horizontally.

Figure 3:
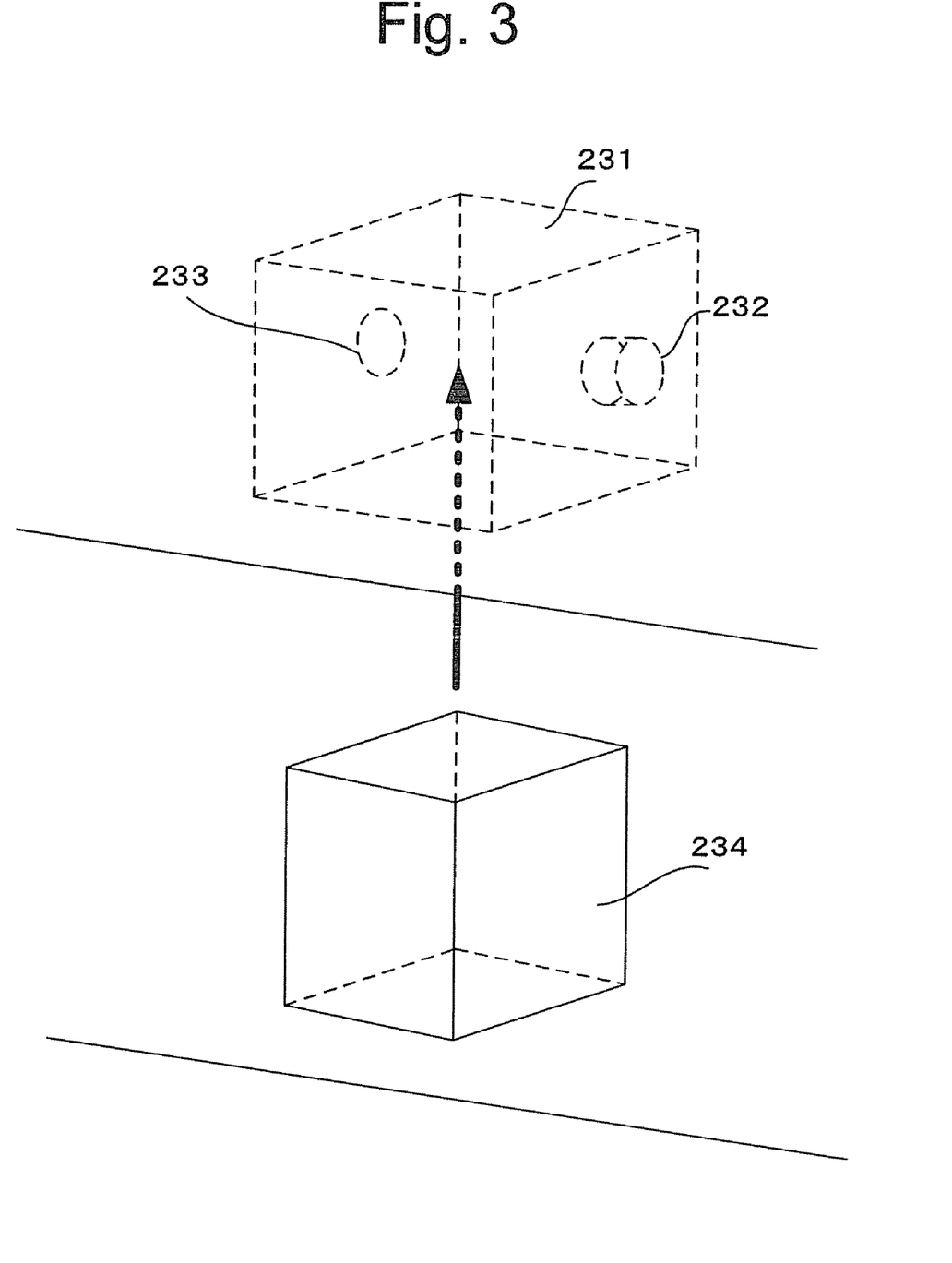
FIG. 3 is an enlarged view of a concave unit and a convex unit of a mounting/demounting detecting unit provided with an optical sensor.

FIG. 3 is an enlarged view of the concave unit 231 and a convex unit 234 of the mounting/demounting detecting unit 131 provided with an optical sensor. As shown in FIG. 3, in case the mounting/demounting detecting unit 131 optically detects mounting and demounting of the base unit 140, the concave unit 231 is provided with, in the inside thereof, an optical sensor 232, and a mirror 233 on a surface facing a surface provided with the optical sensor 232.

When the base unit 140 is mounted on the wireless tag reader/writer 120, the convex unit 234 fits with the concave unit 231, and blocks a light beam of the optical sensor 232 to be reflected on the mirror 233. When the optical sensor 232 detects blockage of the light beam, the mounting/demounting detecting unit 131 detects that the base unit 140 is mounted, and outputs a signal to the reader/writer main body 120*a*.

<Advantage of First Embodiment>

As has been described so far, the wireless tag reader/writer 120 of the present embodiment emits a radio wave from the antenna 121 with a different output power when the reader/writer main body 120*a* detects that the base unit 140 is mounted on the enclosure. Therefore, the wireless tag reader/writer 120 can emit a radio wave with an optimal output power in accordance with an amount of wireless tags to be read and written. Accordingly, there is an advantage that the wireless tag reader/writer 120 can read out and write wireless tags appropriately, in case a small number of wireless tags are read out and written and also in case a large number of wireless tags are read out and written.

<Details of Second Embodiment>
<Configurations of Wireless Tag and Wireless Tag Reader/Writer of Second Embodiment>

Figure 4:
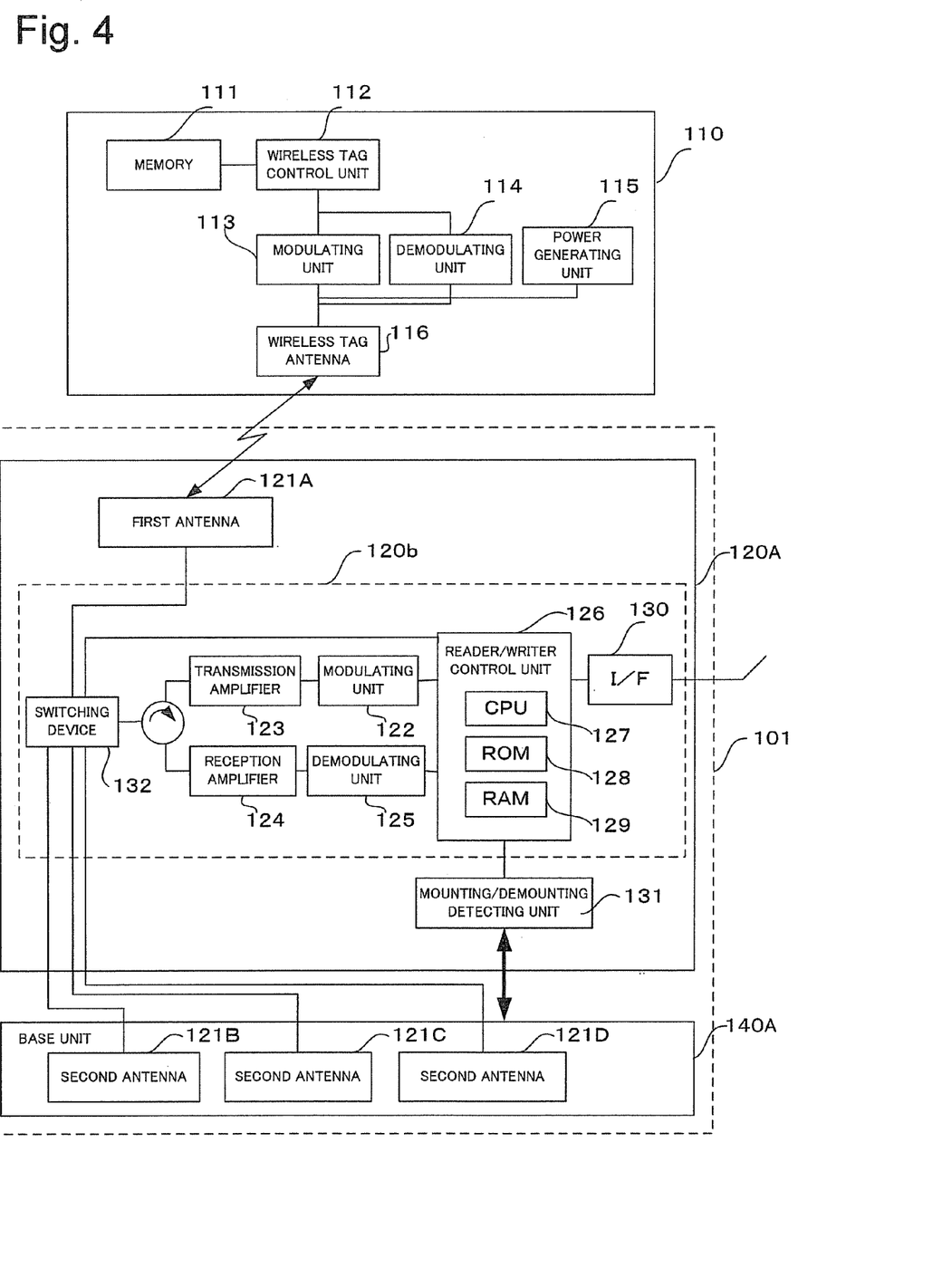
FIG. 4 is a view showing an outline of configurations of the wireless tag and the wireless tag reader/writer of a second embodiment.

FIG. 4 is a view showing an outline of configurations of the wireless tag and the wireless tag reader/writer of the present embodiment. As shown in FIG. 4, the wireless tag 110 has a configuration same as that described in <Details of First Embodiment>

A wireless tag reader/writer 120A of the present embodiment includes a first antenna 121A that transmits and receives a signal to or from the wireless tag 110, a reader/writer main body 120*b* that processes the signal, and the mounting/demounting detecting unit 131 that detects whether a base unit 140A that supports an enclosure containing the antenna 121A and the reader/writer main body 120*b* is mounted on the enclosure.

The base unit 140A has a convex unit that fits with, for example, a concave unit of the mounting/demounting detecting unit 131. When the base unit 140A is mounted on the enclosure, the convex unit fits with the concave unit. The mounting/demounting detecting unit 131 has a detecting means, such as an optical sensor and a mechanical switch, for detecting the convex unit. When the convex unit fits with the concave unit, the detecting means detects that the base unit 140A is mounted, and outputs a signal to the reader/writer main body 120*b*. The detecting means is not limited to the above.

The base unit 140A may have any shape. For example, there is a stand form shape in which the enclosure of a horizontal type is made standing vertically.

The base unit 140A further includes a second antenna that transmits and receives a signal to and from the wireless tag 110. A plurality of the second antennas may be provided. The wireless tag reader/writer 120A has connectors to be connected with second antennas 121B, 121C, and 121D, and the second antennas 121B, 121C, and 121D are configured in a mountable/demountable manner via the connectors.

The reader/writer main body 120*b* includes the first antenna 121A which is an antenna for transmitting and receiving a signal to or from a wireless tag by an electromagnetic wave, the reader/writer control unit 126 that controls hardware communicating with and connected to the wireless tag 110, the modulating unit 122 that modulates data sent out from the reader/writer control unit 126, the transmission amplifier 123 that amplifies the modulated signal and sends out the signal to the antenna 121, the reception amplifier 124 that amplifies the received modulated electromagnetic wave, the demodulating unit 125 that demodulates the received modulated signal, and the interface 130 that is connected to a host device, such as the personal computer 201, to exchange data. In addition, the reader/writer control unit 126 includes the CPU 127, and the ROM 128 and the RAM 129 that store data.

The reader/writer main body 120*b* includes a switching device 132 that switches an antenna used for transmitting and receiving a signal. The switching device 132 can use, for example, an electronic switch controlled by the CPU 127.

<Operation of Wireless Tag Reader/Writer of Second Embodiment>

The wireless tag reader/writer 120A of the present embodiment controls the switching device 132 to emit radio waves from the first antenna 121A and a plurality of the second antennas 121B, 121C, and 121D simultaneously or alternately, when the mounting/demounting detecting unit 131 detects that the base unit 140A is mounted on the enclosure.

Here, "alternately" means that radio waves are emitted repeatedly for each 0.5 second from the first antenna 121A, and the second antennas 121B, 121C, and 121D in this order, for example. Only one second antenna, or four or more second antennas may be provided.

Further, in the wireless tag reader/writer 120A of the present embodiment, when the mounting/demounting detecting unit 131 detects that the base unit 140A is mounted on the enclosure, the reader/writer main body 120*b* emits from the first antenna 121A and a plurality of the second antennas 121B, 121C, and 121D a radio wave with an output power different from an output power of a radio wave emitted when the reader/writer main body 120*b* does not detect that the base unit 140A is mounted on the enclosure.

For example, in the wireless tag reader/writer 120A of the present embodiment, when the mounting/demounting detecting unit 131 does not detect that the base unit 140A is mounted on the enclosure, the reader/writer main body 120*b* emits a radio wave with the first output power from the first antenna 121A and a plurality of the second antennas 121B, 121C, and 121D.

Then, when the base unit 140A is detected to be mounted on the enclosure, the reader/writer main body 120*b* may be configured to emit a radio wave with the second output power from the first antenna 121A and a plurality of the second antennas 121B, 121C, and 121D.

Figure 5:
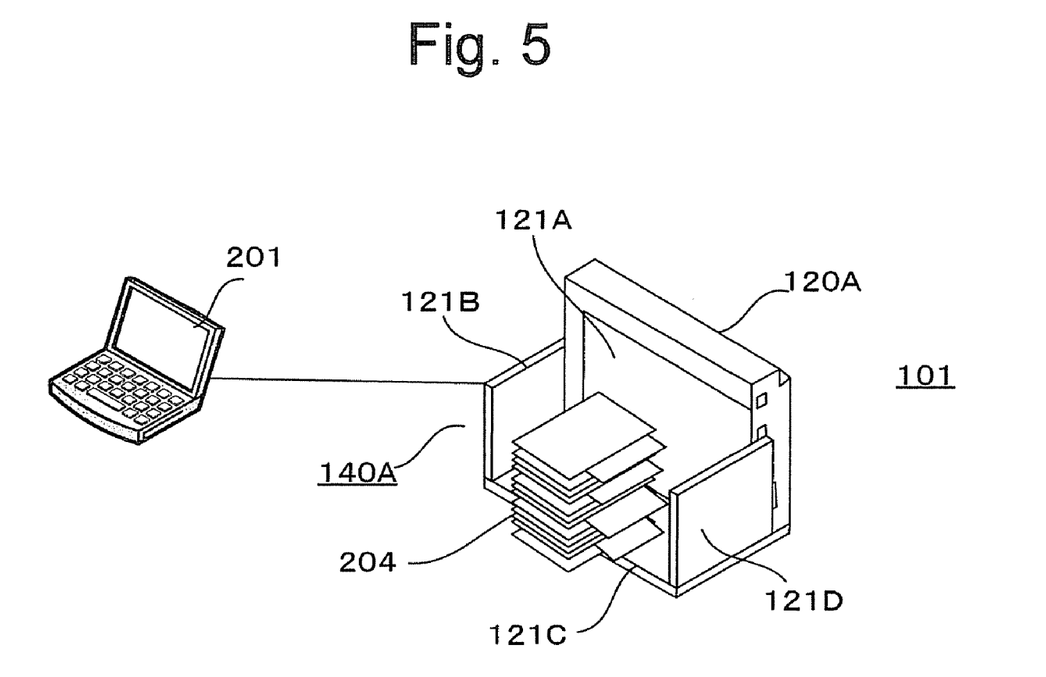
FIG. 5 is a view showing a use state of the wireless tag reader/writer of the second embodiment.

FIG. 5 is a view showing a use state of the wireless tag reader/writer 120A of the present embodiment.

When the base unit 140A is not mounted, the wireless tag reader/writer 120A has the same form as one shown in FIG. 2A. As shown in FIG. 2A, in case the base unit 140A is not mounted, the wireless tag reader/writer 120A is used in a manner placed horizontally, for example. In this case, the wireless tag reader/writer 120A emits a radio wave with the first output power, for example, of 100 mW or higher and 200 mW or lower.

The above output power is a value desirable for when a small number, one to five, of wireless tags 202 are read out by the wireless tag reader/writer 120A in a manner that the wireless tags 202 are held and moved over the wireless tag reader/writer 120A.

As shown in FIG. 5, the base unit 140A is mounted on the wireless tag reader/writer 120A in a manner that the convex unit (not shown) of the base unit 140A fits with a concave unit 131, and thereby a vertically-placed set 101 is constituted.

Examples of the concave unit and the convex unit of the mounting/demounting detecting unit 131 may have configurations similar to those described in the first embodiment.

At that time, the wireless tag reader/writer 120A emits radio waves repeatedly for every 0.5 second from the first antenna 121A and the second antennas 121B, 121C, and 121D in this order. Further, the wireless tag reader/writer 120A emits a radio wave with the second output power which is different from the first output power from the first antenna 121A and the second antennas 121B, 121C, and 121D.

In a first case, a radio wave is emitted with an output power of the second output power, for example, around 300 mW or higher and 500 mW or lower, which is different from the first output power. This output power has a value desirable for when a large number, around six to several tens, of wireless tags 202 existing densely are read out by the wireless tag reader/writer 120A.

Even when a radio wave has an output power of the above extent, as long as the second antennas 121B, 121C, and 121D are allocated in a manner surrounding a radio wave emitting surface of the first antenna 121A in a radio wave emitting direction as shown in FIG. 5, the enclosure containing the second antennas blocks radio waves, and reading out of wireless tags which are not desired to be communicated and located around the wireless tag reader/writer 120 is prevented.

In a second case, a radio wave is emitted with the second power, 50 mW or higher and 150 mW or lower, which is different from the first output power. This output power has a value desirable for when a wireless tag is read out by being located close to the first antenna or the second antenna, regardless of the number of the wireless tags 202.

That is, as shown in FIG. 5, if the second antennas 121B, 121C, and 121D are allocated in a manner surrounding the radio wave emitting surface of the first antenna 121A in the radio wave emitting direction, the operator can make the wireless tags 202 located closer to each of the antennas easily in a manner as though throwing the wireless tags 202 to each of the antennas. Alternatively, the operator can make a number of the wireless tags 202 located closer to each of the antennas in a manner as though pressing the wireless tags 202 against each of the antennas.

In addition, in comparison with a case in which only one antenna is used for communication, by allocating each of the antennas in the above manner, an area that each of the antennas is required to supply a radio wave does not have to be large.

In view of the above reasons, communication with the wireless tags 202 is possible even with an output power of around 50 mW or higher and 150 mW or lower.

The wireless tag reader/writer 120A may be configured in a manner that, when the mounting/demounting detecting unit 131 does not detect that the base unit 140A is mounted on the enclosure, the reader/writer main body 120A emits a radio wave with the first output power from the first antenna 121A and a plurality of the second antennas 121B, 121C, and 121D, and when the mounting/demounting detecting unit 131 detects that the base unit 140A is mounted on the enclosure, the reader/writer main body 120A emits a radio wave with the second output power, or a third output power which is different from the first and the second output powers, from the first antenna 121A and a plurality of the second antennas 121B, 121C, and 121D.

In the above case, for example, the first output power may be 100 mW or higher and 200 mW or lower, the second output power may be 300 mW or higher and 400 mW or lower, and the third output power may be 50 mW or higher and 150 mW or lower.

<Advantage of Second Embodiment>

As has been described so far, when the base unit 140A is detected to be mounted on the enclosure, the wireless tag reader/writer 120A of the present embodiment has the reader/writer main body 120b control the switching device 132 to emit radio waves simultaneously or alternately from the first antenna and the second antennas. For this reason, there is an advantage that even a number of wireless tags to be read out and written existing densely and disorderly can be appropriately read out and written. In addition, in accordance with the operator's way of making the wireless tags 202 read out in the wireless tag reader/writer 120A, an appropriate value can be chosen for an output power of a radio wave to be emitted.

In short, when the wireless tag reader/writer is placed vertically, transmission and reception are carried out with a larger number of wireless tags than when the wireless tag reader/writer is placed horizontally. Therefore, when the wireless tag reader/writer is placed vertically, an output power of a radio wave to be emitted is preferably made larger than when the wireless tag reader/writer is placed horizontally. In this manner, the wireless tag reader/writer placed vertically can carry out transmission and reception with a number of wireless tags.

The present invention is not limited to the configuration shown in the above embodiments as they are, and components may be embodied by being modified to the extent not deviating from the gist of the present invention in a practical stage. In addition, a variety of inventions may be made by appropriately combining a plurality of the components disclosed in the above embodiments. For example, several components may be omitted from all the components shown in the embodiments. Further, the components covering different embodiments may be appropriately combined.

What is claimed is:

1. A wireless tag reader/writer, comprising:
    a first antenna that transmits and receives a signal to and from a wireless tag;
    a reader/writer main body that includes a switching device for switching the antenna that transmits and receives the signal, and processes the signal; and
    a mounting/demounting detecting unit that detects whether a base unit that includes a second antenna that transmits and receives a signal to and from the wireless tag, and supports an enclosure containing the first antenna and the reader/writer main body is mounted on the enclosure, wherein
    when the mounting/demounting detecting unit detects that the base unit is mounted on the enclosure, the reader/writer main body controls the switching device to emit radio waves simultaneously or alternately from the first antenna and the second antenna.

2. The wireless tag reader/writer according to claim 1, wherein the base unit includes a plurality of the second antennas, and when the mounting/demounting detecting unit detects that the base unit is mounted on the enclosure, the reader/writer main body controls the switching device to emit radio waves simultaneously or alternately from the first antenna and the second antenna.

3. The wireless tag reader/writer according to claim 2, wherein an output power of a radio wave to be emitted when the base unit is not detected to be mounted on the enclosure is 100 mW or higher and 200 mW or lower, and an output power of a radio wave to be emitted when the base unit is detected to be mounted on the enclosure is 300 mW or higher and 400 mW or lower.

4. The wireless tag reader/writer according to claim 2, wherein an output power of a radio wave to be emitted when the base unit is not detected to be mounted on the enclosure is 100 mW or higher and 200 mW or lower, and an output power of a radio wave to be emitted when the base unit is detected to be mounted on the enclosure is 50 mW or higher and 150 mW or lower.

5. A wireless tag reader/writer, comprising:
a first antenna that transmits and receives a signal to and from a wireless tag;
a reader/writer main body that processes the signal; and
a mounting/demounting detecting unit that detects whether a vase unit for supporting an enclosure containing the antenna and the reader/writer main body and including a second antenna that transmit and receives data to and from the wireless tag is mounted on the enclosure, wherein when the mounting/demounting detecting unit detects that the base unit is mounted on the enclosure, the reader/writer main body emits from the first antenna and second antenna radio waves with an output power different from an output power of radio waves emitted by the reader/writer main body when the base unit is not detected to be mounted on the enclosure.

6. The wireless tag reader/writer according to claim 5, wherein the base unit includes a plurality of the second antennas, and when the mounting/demounting detecting unit detects that the base unit is mounted on the enclosure, the reader/writer main body emits from the first antenna and the plurality of second antennas radio waves with an output power different from an output power of a radio wave emitted by the reader/writer main body when the base unit is not detected to be mounted on the enclosure.

7. The wireless tag reader/writer according to claim 5, wherein an output power of a radio wave to be emitted when the base unit is not detected to be mounted on the enclosure is 100 mW or higher and 200 mW or lower, and an output power of a radio wave to be emitted when the base unit is detected to be mounted on the enclosure is 300 mW or higher and 400 mW or lower.

8. The wireless tag reader/writer according to claim 5, wherein an output power of a radio wave to be emitted when the base unit is not detected to be mounted on the enclosure is 100 mW or higher and 200 mW or lower, and an output power of a radio wave to be emitted when the base unit is detected to be mounted on the enclosure is 50 mW or higher and 150 mW or lower.

9. The wireless tag reader/writer according to claim 5, wherein an output power of a radio wave to be emitted when the base unit is not detected to be mounted on the enclosure is 100 mW or higher and 200 mW or lower, and an output power of a radio wave to be emitted when the base unit is detected to be mounted on the enclosure is 300 mW or higher and 400 mW or lower, or 50 mW or higher and 150 mW or lower.

* * * * *